(12) United States Patent
Habib et al.

(10) Patent No.: US 9,467,520 B2
(45) Date of Patent: Oct. 11, 2016

(54) INTEGRATED LEARNING APPLICATION

(71) Applicant: Intel Corporation, Santa Clara, CA (US)

(72) Inventors: Babur Habib, San Francisco, CA (US); Osman Rashid, Fremont, CA (US); David Straus, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 415 days.

(21) Appl. No.: 13/948,437

(22) Filed: Jul. 23, 2013

(65) Prior Publication Data

US 2014/0025745 A1   Jan. 23, 2014

Related U.S. Application Data

(60) Provisional application No. 61/674,845, filed on Jul. 23, 2012.

(51) Int. Cl.

| | |
|---|---|
| *G06F 15/16* | (2006.01) |
| *H04L 29/08* | (2006.01) |
| *H04L 12/58* | (2006.01) |
| *G09B 7/06* | (2006.01) |
| *G06Q 10/10* | (2012.01) |
| *G06Q 50/00* | (2012.01) |

(52) U.S. Cl.
CPC ............. *H04L 67/22* (2013.01); *G06Q 10/101* (2013.01); *G06Q 50/01* (2013.01); *G09B 7/06* (2013.01); *H04L 51/32* (2013.01)

(58) Field of Classification Search
None
See application file for complete search history.

(56) References Cited

U.S. PATENT DOCUMENTS

| | | | | |
|---|---|---|---|---|
| 8,281,372 | B1 * | 10/2012 | Vidal ..................... | H04L 51/12 709/206 |
| 8,798,522 | B2 * | 8/2014 | Nguyen et al. .............. | 434/362 |
| 2001/0049084 | A1 * | 12/2001 | Mitry .................... | G09B 19/00 434/118 |
| 2009/0047650 | A1 * | 2/2009 | Leuck et al. ................. | 434/350 |
| 2009/0144193 | A1 * | 6/2009 | Giordano et al. ............. | 705/39 |
| 2009/0291426 | A1 * | 11/2009 | Polivka ........................ | 434/350 |
| 2010/0324941 | A1 * | 12/2010 | Stevenson ............. | G06N 3/006 705/4 |
| 2011/0004550 | A1 * | 1/2011 | Giordano ............... | G06Q 20/04 705/40 |
| 2012/0124482 | A1 * | 5/2012 | Ray ........................ | G06Q 50/00 715/751 |
| 2013/0142322 | A1 * | 6/2013 | Grasso ............. | G06Q 10/06398 379/265.08 |

* cited by examiner

*Primary Examiner* — Scott B Christensen
(74) *Attorney, Agent, or Firm* — Schwabe, Williamson & Wyatt, P.C.

(57) ABSTRACT

The instant invention is an apparatus and method to improve the learning experience by integrating feedback from multiple people through existing social media. The invention enables users, from within an application external to a social networking site, to automatically or manually post comments in social media related to the learning metrics of their own or other users that they have access to. These posts or comments are identifiable as associated with the external app and associated with user who posted and to the owner of the learning metric. The message can either be completely authored by the user, automatically or semi-automatically generated by the external app.

14 Claims, 7 Drawing Sheets

INTEGRATED LEARNING APPLICATION

CROSS REFERENCE TO RELATED APPLICATIONS

This application claims the benefit of provisional application No. 61/674,845 filed on Jul. 23, 2012, which is incorporated by reference in its entirety.

FIELD OF THE INVENTION

The invention relates generally to integration of data. More particularly, the invention relates to an integrated learning application.

BACKGROUND OF THE INVENTION

Currently, Facebook's Graph API, allows designers and developers to display Facebook users' wall contents, other pages and apps pages, onto an external website. Likewise, apps can be integrated with Facebook and pull down content in real time. Furthermore, comments on status updates, pictures, and links can be posted on Facebook from directly within an app, just as you might on Facebook itself. There is still a need however for more flexible and targeted abilities to leverage the information accumulated in social networking sites such as Facebook.

SUMMARY OF THE INVENTION

An apparatus and method to improve the learning experience by integrating feedback from multiple people through existing social media.

DETAILED DESCRIPTION OF THE DRAWINGS

In the instant invention, an app outside of Facebook or other social networking site is able to pull content not just from their own account but from other user's accounts as well. Additionally, in another aspect of the invention, a person without a Facebook account at all can use an app external to Facebook or other social networking site to post and receive posts and comments about information related to the app. In one embodiment of invention, the app outside of Facebook or other social networking site is able to identify a particular category of information and/or particular user that is associated with the app and utilize that specific category of information and/or user for posting and retrieval of posts and comments.

For example, in one embodiment of the invention, the external app is an integrated learning app. One particular type of information related to the app is a learning metric. The different users are administrators, teachers, students, parents and friends. Some but not necessarily all of these users have Facebook (or other social media sites) accounts. Some may not have accounts by choice, others may not be old enough (currently 13) to have their own Facebook account.

In this embodiment, the different users may utilize separate but similar apps that are associated with the learning metric but have different levels of control and access. Alternatively, the same app may have different levels of control and access depending on the type of user account or sign in. For examples, teachers and administrators may be able to see the learning metric of all of the students in a class whereas a parent will only be able to see the learning metric of her child.

From within the app external to Facebook or other social networking site, users can automatically or manually post comments related to the learning metrics of their own or other users that they have access to. These posts or comments are identifiable as associated with the external app and associated with user who posted and to the owner of the learning metric. For example, after viewing a learning metric from of their child, parents can post messages like "Congratulations on your learning metric score of [#]" or "[My child's] learning metric is [#]." The message can either be completely authored by the user, automatically or semi-automatically generated by the external app.

In this way, comments of user one on the learning metric of user two can be posted in Facebook and then relayed to both user one's and user two's user profile in the external app. Responses to the original comment can be processed in the same way. This aspect of the invention helps overcome the issue of the lack of access to Facebook for users under 13 years of age who cannot own Facebook accounts or people who do not want to have Facebook accounts but would benefit from this type of social networking specifically related to their education or interests. Once a particular child turns 13 and is able to create a Facebook account (or person over 13 changes his mind and decides to create a Facebook account), all of the past history of comments that were available in the integrated learning app would now be available in the Facebook app in the newly created Facebook user account.

This relay of information to the external app can be done automatically such that all posts related to both the external app and the particular user are relayed without modification. Alternatively, controls can be set such that there is an automatic or manual filtration of comments. For example, parents could have control over which comments could be displayed in their child's integrated learning app user account. This could be done on an individual comment basis, on an individual Facebook user basis, or on a language screening basis. In this way, particularly unsuitable comments that were posted on the parent's Facebook page or posted from other users of the integrated learning app could be stopped from appearing on the student's integrated learning app account.

In another aspect of the invention, within a particular Facebook user account, sub user accounts can be created, including for children 13 or under or pets etc. In this way, a child 13 or under could have access that is controlled by a parent or senior user to a Facebook account. This has the added advantage of the child or student being able to use the Facebook interface as well as the interface of the integrated learning app. This aspect of the invention can be used more generally to other situations where a senior user and junior user are desirable. Additionally, each account can be representative of multiple personalities. This would also resolve the problem of couples using the same account. Each can have their own sub-account.

Figure 1:
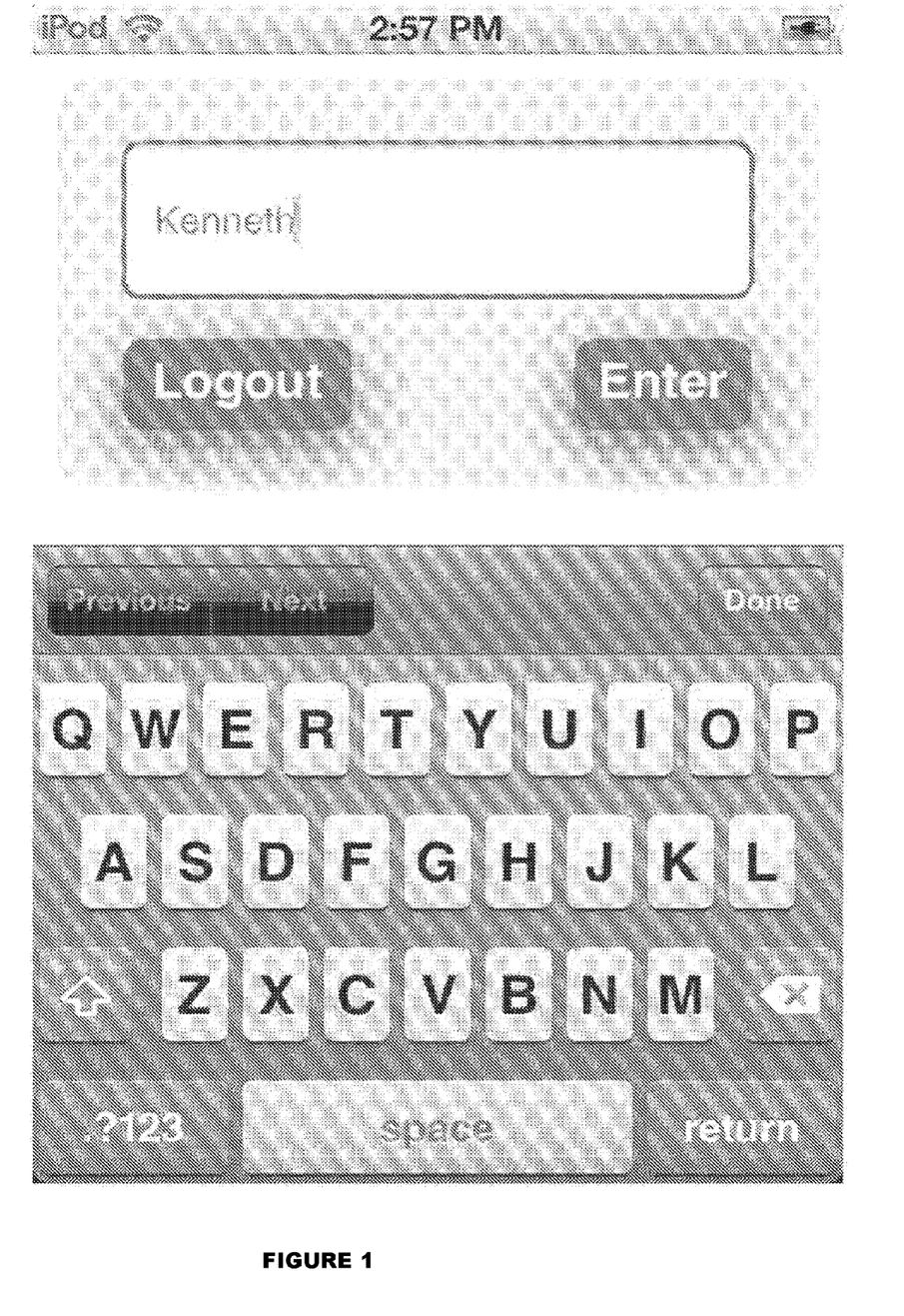
FIG. 1 displays the interface for a user account associated with a learning metric.
Figure 2:
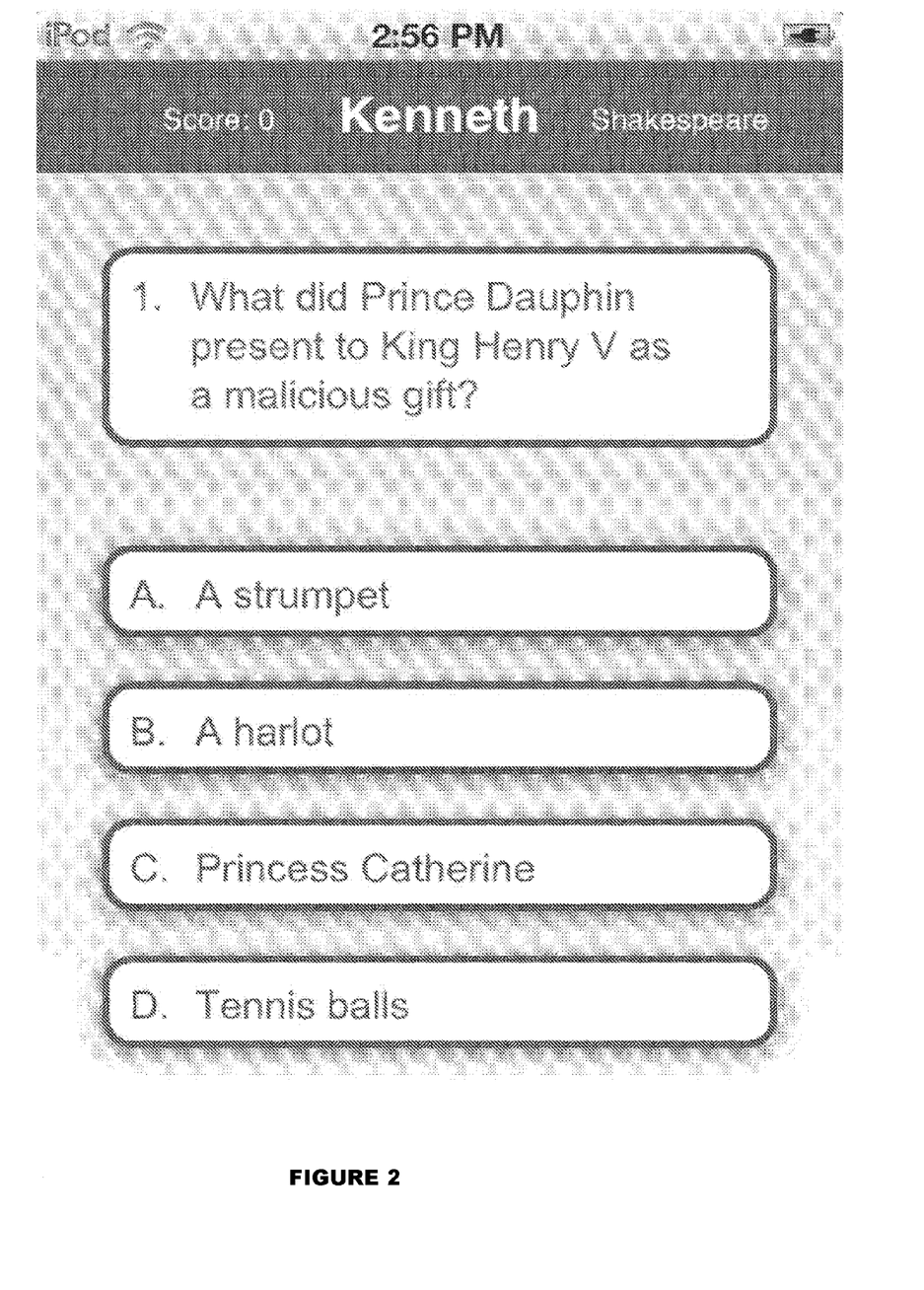
FIG. 2 displays the interface used to generate a learning metric.
Figure 3:
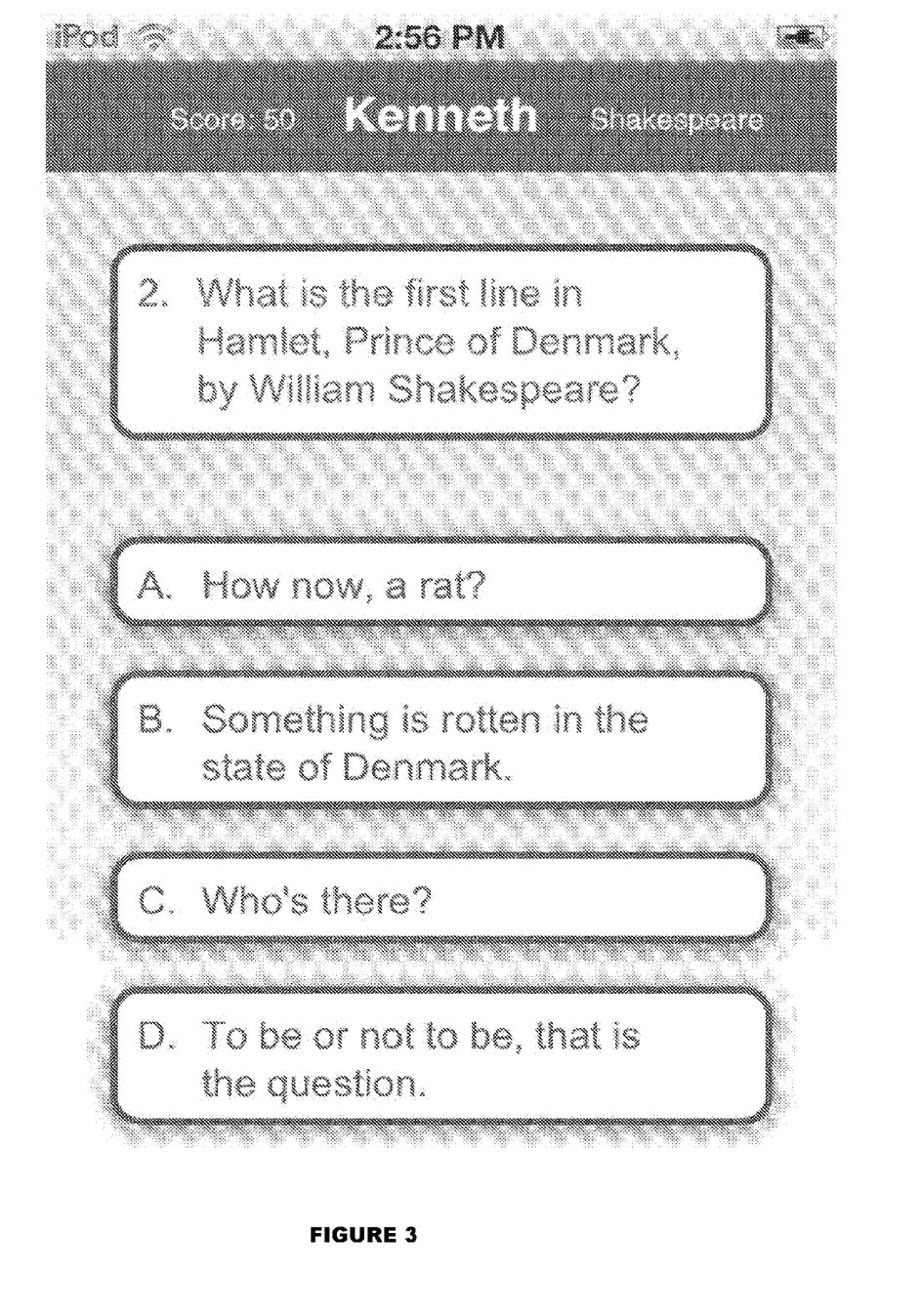
FIG. 3 displays the interface used to generate a learning metric.
Figure 4:
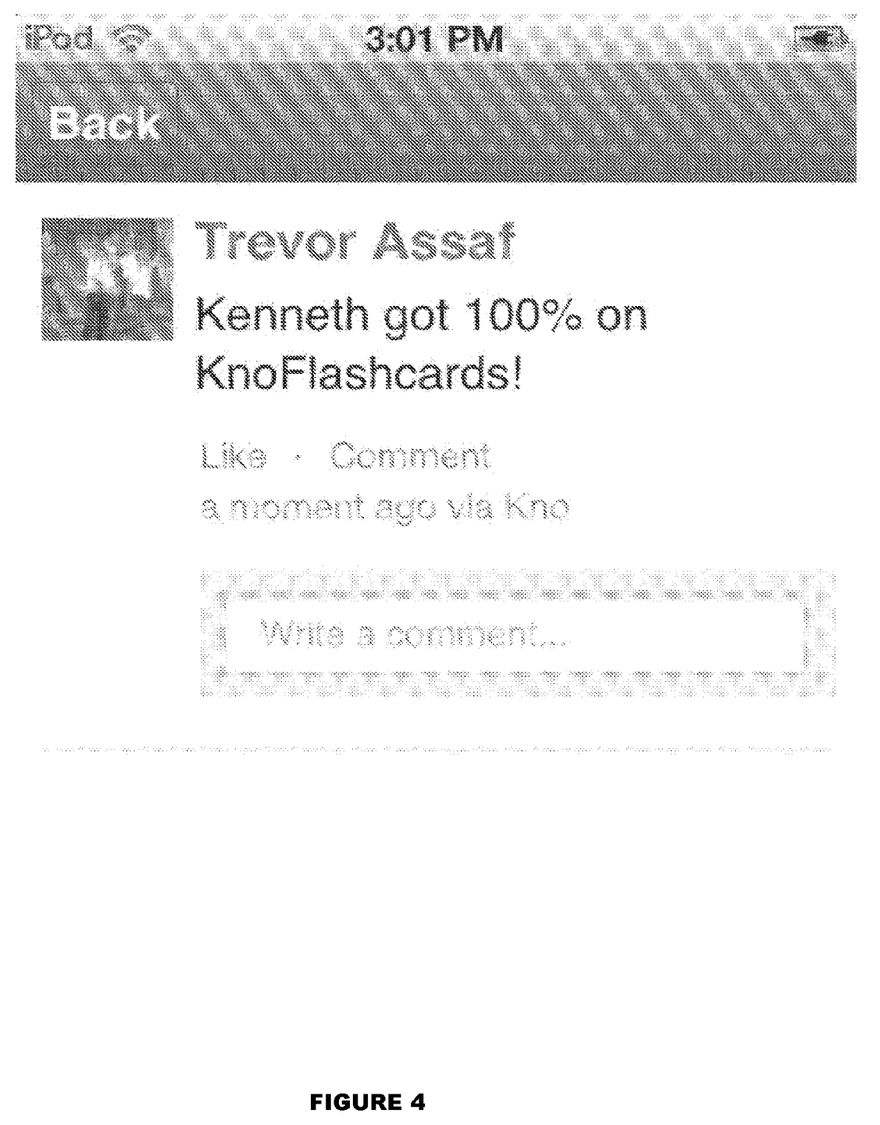
FIG. 4 displays the interface for a comment associated with a learning metric.
Figure 5:
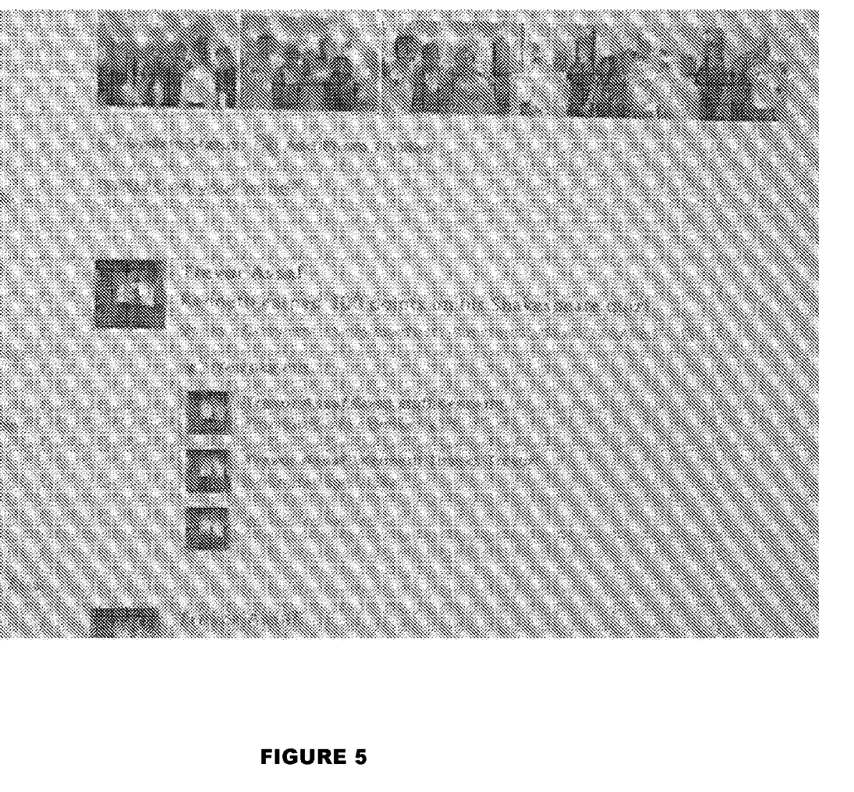
FIG. 5 displays the interface for a second comment associated with a learning metric.
Figure 6:
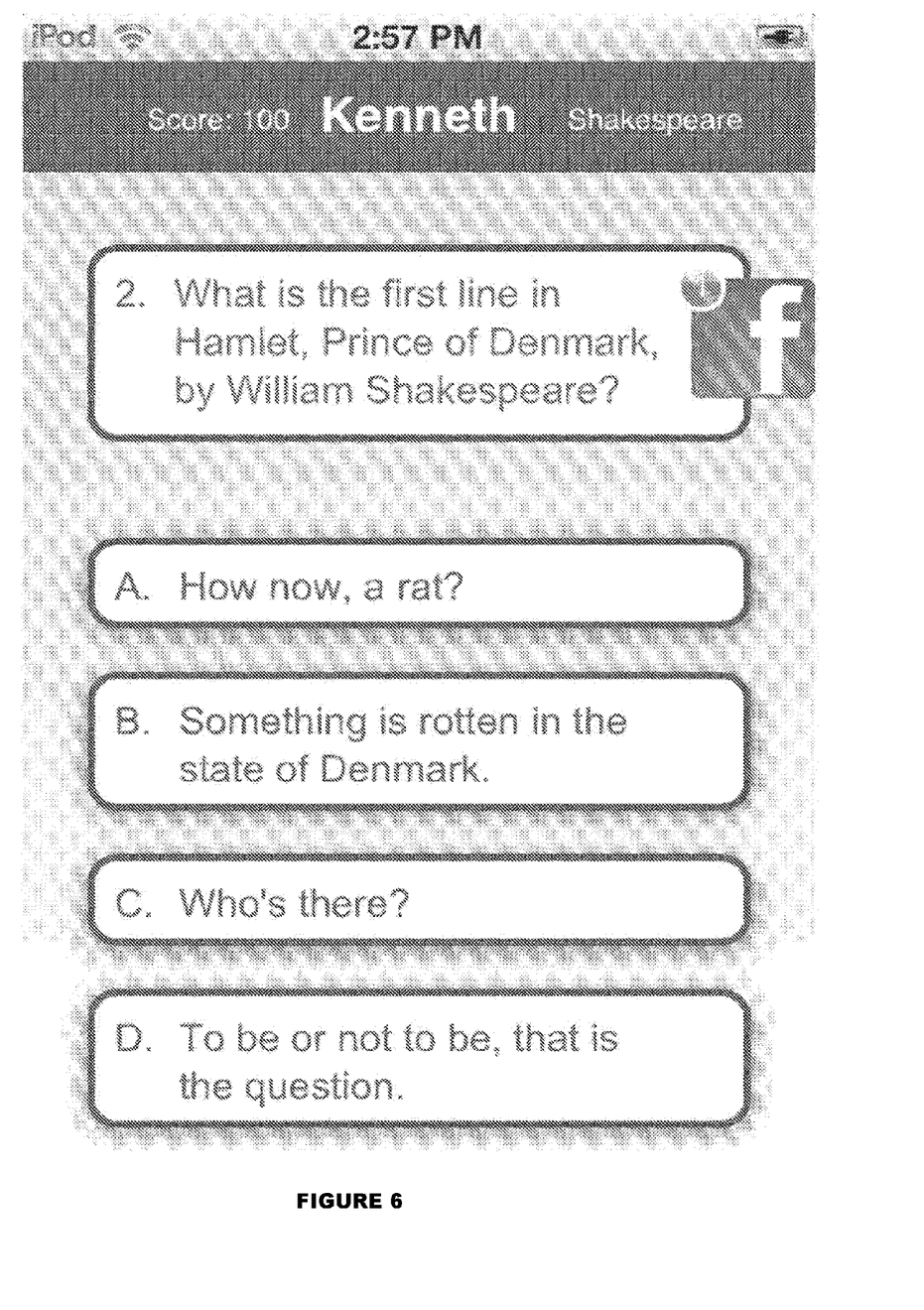
FIG. 6 displays the interface for the integrated comments within the application that generated the learning metric.
Figure 7:
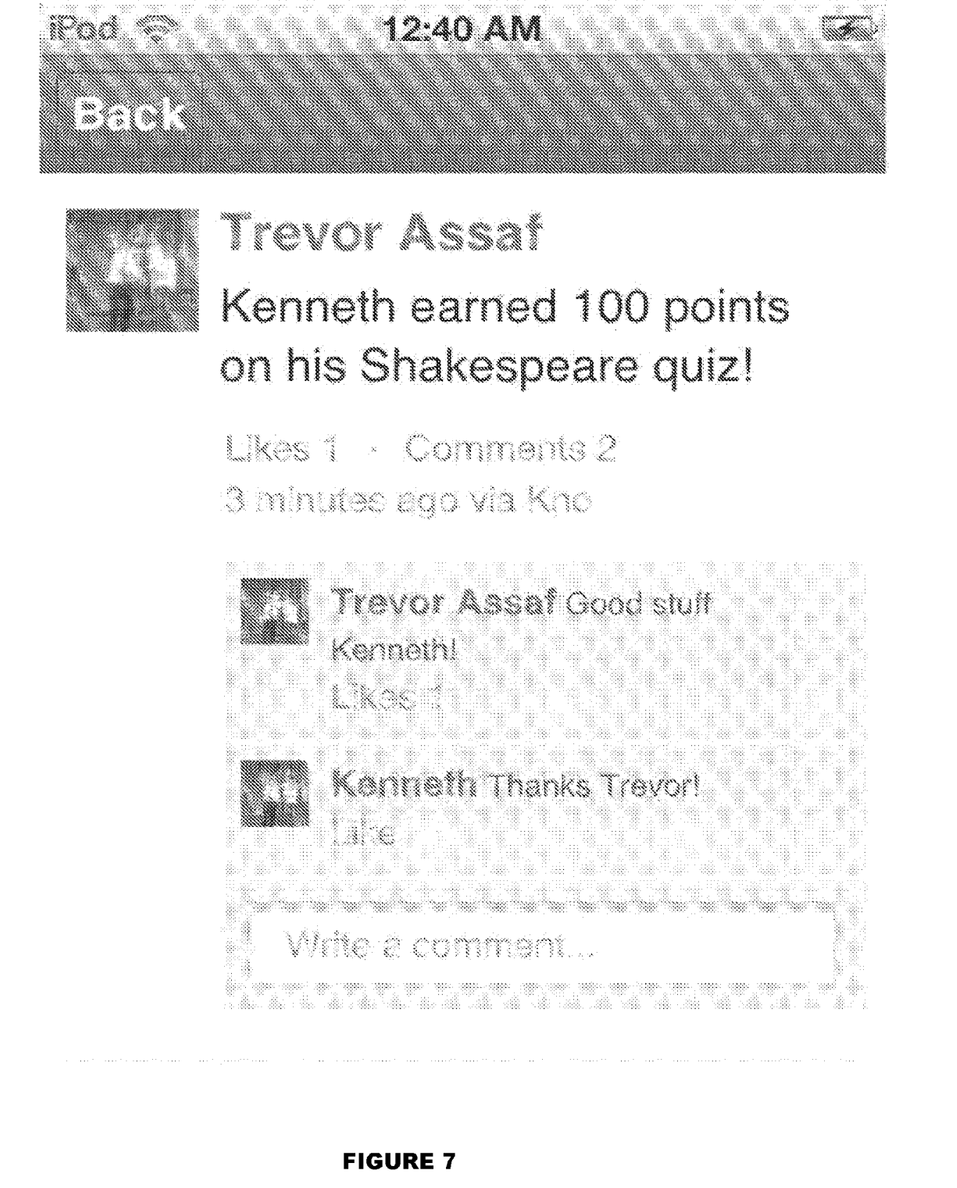
FIG. 7 displays the interface for the integrated comments within the application that generated the learning metric.

In one specific embodiment, the app allows posts through a parent's account. The parent first logs into the app and then enters their child's name (who is under 13 and does not have a Facebook account) as shown in FIG. 1. The app then posts on behalf of the child depending on the child's usage of the app as shown in FIG. 2 and FIG. 3 or the child's data obtained from another account as shown in FIG. 4. The child's name appears in the post on the parent's Facebook account. The parent's friends can then comment on the post, and like it as shown in FIG. 5. The comments and likes then appear in the app for the particular child as shown in FIG. 6 and FIG. 7. When the child turns 13 and is allowed their own Facebook account, then the data can be transferred over that account. The Facebook timeline will begin from a lot earlier age than when the child account on Facebook is created.

This invention is not intended to be limited to Facebook as the social networking site to be used. It will work equally well with other social networking sites that can share information in the manner described.

What is claimed is:

1. A computer-implemented method, comprising:
   generating, by a computer processor, a learning metric for a user of a learning application;
   providing, by the computer processor, to a social networking application, a posting for display on the social networking application, the posting including information about the learning metric;
   identifying, by the computer processor, a comment related to the posting and posted for display on the social networking application;
   retrieving, by the computer processor, from the social networking application, the comment;
   providing, by the computer processor, to the learning application, the comment for display on the learning application, wherein the learning application provides the user account access to view the comment on the learning application while the user has restricted account access to the social networking application, the restricted account access preventing the user from creating or viewing posts through the social network application; and
   wherein the comment and a past history of comments available through the learning application are made accessible to the user via an unrestricted social networking account created by the user when the restricted account access is lifted.

2. The computer-implemented method of claim 1, wherein the user comprises a first user and the comment comprises a first comment, the method further comprising receiving for the learning application, in response to the first comment, a second comment by a second user of the learning application and further comprising providing by the processor to the social networking application the second comment for display on the social networking application.

3. The computer-implemented method of claim 2, wherein providing to the social networking application by the processor the second comment for display comprises providing the second comment for display to an account that allows a user access to the social networking application through a sub-account of another user.

4. The computer-implemented method of claim 1, wherein providing the comment for display by the processor on the learning application includes providing the comment for display on a profile of the user on the learning application.

5. The computer-implemented method of claim 2, wherein the second comment by the second user is semi-auto generated.

6. The computer-implemented method of claim 1, wherein restricted account access is based upon terms of service of the social networking application.

7. The computer-implemented method of claim 1, wherein providing by the computer processor the comment for display on the learning application includes automatically providing a comment for display on the learning application.

8. The computer-implemented method of claim 1, further including filtering, by the computer processor, the comment prior to providing the comment for display on the learning application.

9. A non-transitory computer-readable storage medium having tangibly embodied thereon a program of instructions executable by a processor for performing a method, the instructions causing the processor to execute a number of steps, including:
   generating a learning metric associated with a first person having an account with a learning application;
   providing to a social networking application for display on the social networking application a first set of comments related to the learning metric;
   accepting from the social networking application a second set of comments displayed on an account of the social networking application of a second person and related to the first set of comments and the learning metric; and
   displaying on the account with the learning application the second set of comments, wherein the learning application is to allow the first person access to the account with the learning application while having restricted access to an account with the social networking application, the restricted account access to prevent the first person from creating or viewing posts through the social networking application; and
   wherein the first and the second set of comments and a past history of comments available through the learning application are made accessible to the first person via an unrestricted social networking account created by the first person when the restricted account access is lifted.

10. The non-transitory computer-readable storage medium of claim 9, wherein restricted access to the account with the social networking application includes access to a sub-account of a third person having an account with the social networking application.

11. The non-transitory computer-readable storage medium of claim 9, wherein the exclusion is based upon terms of service of the social networking application.

12. The non-transitory computer-readable storage medium of claim 9, wherein instructions for providing to the social networking application the first set of comments includes instructions for providing auto-generated comments to the social networking application for display.

13. The non-transitory computer-readable storage medium of claim 9, further including instructions for filtering the second set of comments accepted from the social networking application prior to displaying the second set of comments on the account with the learning application.

14. The non-transitory computer-readable storage medium of claim 9, further comprising instructions for identifying the first set of comments as associated with the learning application prior to providing the first set of comments to the social networking application for display.

* * * * *